Feb. 24, 1970     J. A. HANSEN     3,497,666
BEAM PROTECTION DEVICE
Filed April 11, 1968
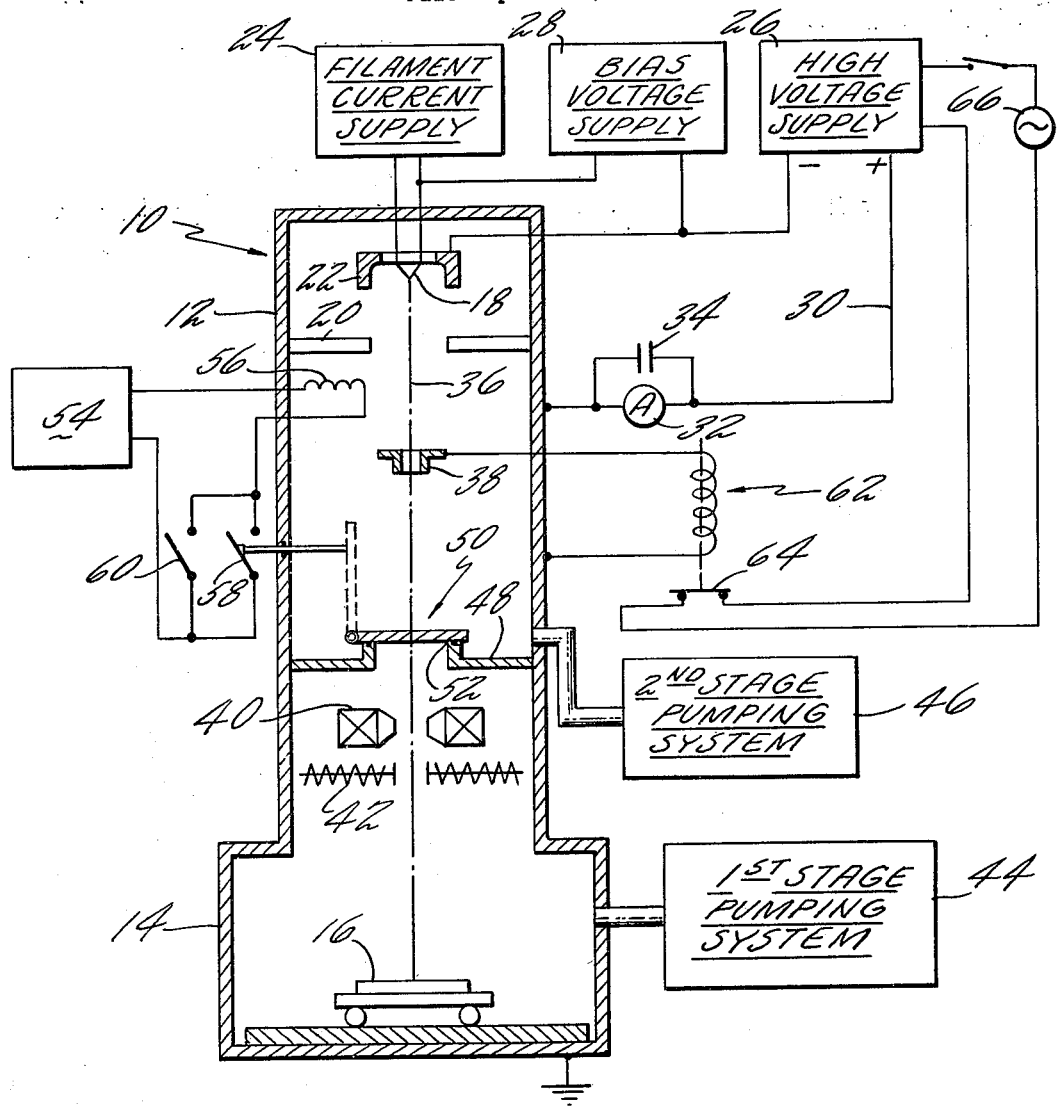
INVENTOR
JOHN A. HANSEN
BY John C. Linderman
AGENT

United States Patent Office 3,497,666
Patented Feb. 24, 1970

3,497,666
BEAM PROTECTION DEVICE
John Alfred Hansen, East Granby, Conn., assignor to United Aircraft Corporation, East Hartford, Conn., a corporation of Delaware
Filed Apr. 11, 1968, Ser. No. 720,693
Int. Cl. B23k 15/00
U.S. Cl. 219—121    9 Claims

ABSTRACT OF THE DISCLOSURE

A protective device for use in a machine employing a high intensity beam of charged particles for working materials. The device generates a beam deflection field while the beam is supposed to be off and causes any beam which is inadvertently generated to be deflected toward a sensor. The sensor responds by deenergizing the power source of the beam generator.

BACKGROUND OF THE INVENTION

This invention relates to working materials with an intense beam of charged particles. More particularly, the invention is directed to a protective device which prevents damage to the machine or the workpiece by an inadvertently generated beam.

The invention has particular utility in an electron beam machine. Electron beam machines, as they are generally known, are devices which use the kinetic energy of an electron beam to work a material. U.S. Patent No. 2,987,-610, issued June 6, 1961, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. In fact, the temperature becomes so high that the material either melts or evaporates.

The high energy electron beams employed in working the materials in this manner can cause serious damage to the machine or the workpiece if the beam is unintentionally generated while the workpiece is being moved, or parts of the machine are temporarily interposed in the beam path or if the beam becomes misaligned within the machine. The components of the machine which are most likely to be damaged are those such as electrostatic or magnetic deflection and focusing systems, optical viewing mirrors or lens and column valves which permit the beam to pass between high vacuum chambers and the work chamber in the machine column.

Electron beam machines which are used continuously in high production plants often employ several vacuum stages along the machine column to reduce the size of the vacuum chambers and the pump-down time. This feature is particularly desirable where parts are frequently removed from and inserted into the work chamber between machining operations. Column valves interposed between the work chamber and the different vacuum stages are closed while parts are being exchanged. Furthermore, to preserve the life of components in the electron gun, such as the filament, and the components which apply high voltage between the cathode and anode of the gun, electrical power remains on during workpiece shifting or exchanging operations. In this standby condition, the electron beam is biased off by means of a control electrode or grid to prevent beam generation. However, if the operator inadvertently turns the beam on or if the beam is accidentally generated through a fault of the control circuitry or if the grid bias is destroyed by a discharge between the control grid and the cathode, serious damage may result to either the column valve or the workpiece.

SUMMARY OF THE INVENTION

This invention overcomes the above-mentioned deficiencies of the prior art machines by providing a new, safer and more positive means of protecting a machine which utilizes an intense beam of charged particles against damage caused by either misalignment of the beam within the machine or inadvertent generation of the beam while in the standby condition.

The invention employs a beam spoiler or deflection field generator which is activated by a beam spoiling or cut-off signal while the beam is held in the standby condition. The beam spoiler may be formed by a simple magnetic deflection coil which generates a deflection field transverse to the axis of the machine along which the beam would normally pass. The deflection field causes the beam to be deflected from the machine axis toward a sensing element and the sensing element is interlocked with the beam power supply to disengage such power when the beam impinges on the sensor.

The beam sensor may take the form of an electrically conductive annular target concentrically mounted about the machine axis. The target is insulated from its structural support members within the machine but is electrically connected to a relay so that a portion of the current from an electron beam impinging on the target will flow from the target through the relay solenoid and actuate the relay. The relay may be a bistable device and has contacts interposed in the power circuit for the high voltage beam power supply. When the solenoid is actuated by a deflected or misaligned beam, the high voltage supply is deenergized to prevent damage to parts of the machine or workpiece.

BRIEF DESCRIPTION OF THE DRAWING

The drawing shows a typical installation of the protective device in an electron beam machine.

DESCRIPTION OF THE PREFERRED EMBODIMENTS

With reference to the drawing, an electron beam machine, generally designated 10, is shown composed of an upper column 12 integrally connected with a work chamber 14. A workpiece 16 is positioned within the work chamber 14 so that it can be shifted from one position to another for various working operations. The upper column 12 contains an electron gun composed principally of a cathode 18, an anode 20 and a control electrode 22 such as a Wehnelt cylinder, described more fully in U.S. Patent No. 2,771,568 issued Nov. 20, 1956 to K. H. Steigerwald. The cathode 18 may be directly heated by a filament current supply 24. A high voltage power supply 26 generates an accelerating potential between the cathode 18 and the anode 20 which is grounded to the upper column 12. A bias voltage supply 28 is interposed between the cathode 18 and the power supply 26 to establish the control voltage bias between the cathode 18 and the control grid 22. For further details concerning the function and description of the bias voltage supply 28, reference may be made to my U.S. Patent No. 3,177,434, issued Apr. 6, 1965.

The high voltage power supply 26 provides a large negative potential to the cathode 18 through the bias voltage supply 28 and the positive side of the power supply 26 is connected through conductor 30 and the grounded housing of the machine 10 to the anode 20 at the same potential as the housing. An ammeter 32 is interposed in the conductor 30 for measuring the current of the electron beam. A bypass capacitor 34 is connected in parallel with the ammeter 32 to bypass AC current flowing through the conductor 30 and a diode rectifier in the high voltage power supply 26 due to capacitive coupling between a transformer and ground in the power supply 26.

A beam generated and controlled by the electron gun comprised by the cathode 18, the anode 20 and the control grid 22 will pass along the machine axis 36 through an annular diaphragm 38, described below to the workpiece 16 in chamber 14. In order to produce a beam of high power density at the point of impingement on the workpiece, a magnetic focusing lens 40 is provided. In order to deflect the beam to various points on the workpiece, deflection coils 42 are also positioned in the vicinity of the workpiece adjacent to the machine axis 36. Although only two deflection coils are shown, it will be understood that two pairs of deflection coils positioned at 90° to one another may be employed to deflect the beam in different directions on the surface of a workpiece. The workpiece will also be at ground potential through contact with the work chamber 14.

In order to reduce the down time while workpieces are removed and installed in the work chamber, the machine 10 has a first stage pumping system 44 which produces a soft vacuum in the work chamber and a second stage pumping system 46 which produces a hard vacuum in the upper column 12 for generation of the electron beam. A partition 48 including a column valve 50 separates the upper column 12 from the work chamber 14. By employing two separate pumping systems and the column valve 50, it is possible to open the work chamber for removing and inserting workpieces without losing the hard vacuum in the upper column 12. In its closed position, the valve 50 with gas seal 52 prevents gas from passing from the work chamber 14 to the upper column 12, and the more limited volume of the work chamber 14 alone can be evacuated at a faster rate in preparation for the beam operation.

It is readily apparent from the construction of the machine 10 that a high intensity working beam could very easily destroy important components of the machine such as the valve 50 or the workpiece 16 if the beam is inadvertently generated while power is on and the gun is supposed to be in the standby condition. For this reason, a beam spoiler 54 is provided which includes a deflection device 56 adjacent to the beam axis to deflect any inadvertently generated beam toward the annular diaphragm or target 38. The deflection device 56 may be an inexpensive magnetic coil sufficient to generate a deflection field transverse to the axis 36 immediately below the anode 20. For this purpose, the beam spoiler 54 may provide either an AC or DC current to the deflection coil 56.

The activation of the beam spoiler 54 may be accomplished by a beam spoiling signal from any number of means. For example, a limit switch 58 may be closed to actuate the spoiler 54 whenever the valve 50 is moved away from its open position (shown in phantom) in which the beam is free to pass through the partition 48. Preferably, a switch 60 could be operated automatically from the bias control 28 at the same time the beam is biased on or off. The beam spoiler in response to either of these signals will prevent damage caused by arcing between the cathode and control grid 22 or a failure in the bias circuit by immediately deflecting the beam to the annular diaphragm 38.

The annular diaphragm 38 serves as a target for a deflected beam. Because of its function, the diaphragm 38 can be an inexpensive, electrically conductive piece installed for easy replacement. The diaphragm 38 is mounted along the machine axis so that during normal operation, the beam passes directly through its central aperture. The diaphragm 38 is electrically insulated from the machine housing but is connected in series with a bistable relay 62 to the upper column 12 and the grounded or positive side of the high voltage power supply 26. A portion of the current from a beam which is deflected to the diaphragm 38 will flow through the solenoid of relay 62 and actuate the contacts 64, interlocking the AC power source 66 to the high voltage power supply 26. The contacts 64 will break the circuit between the power source 66 and the high voltage power supply 26 and cut off the high intensity beam before significant damage is done to the machine. Since the relay 62 is a bistable device, once the relay has been tripped to deenergize source 66, the high voltage from power supply 26 to the beam gun will remain off until relay 62 is reset and contacts 64 are again closed. The resetting operation can be performed by the machine operator through any conventional means after the cause of the malfunction has been corrected.

It should also be noted that the apertured diaphragm will perform the same protective function if for any reason the beam becomes misaligned with the machine axis. A misaligned beam could also cause serious damage to the internal structure of the machine and particularly to the expensive components such as the focusing lens 40 or the deflection coils 42.

While a preferred embodiment has been shown and described, various modifications and substitutions may be made without departing from the scope and spirit of the invention. For example, a second deflection coil operated by the beam spoiler 54 could be positioned in a plane perpendicular to the machine axis and 90° from coil 56. This additional coil could be excited by an AC voltage operating with a 90° phase lag from the AC voltage driving coil 56. Both coils operating in this manner would generate a circular sweep of an inadvertently generated beam so that it would continually impinge upon the annular diaphragm without striking any other portion of the machine. The invention, therefore, is not limited to the specific embodiments illustrated and described, but may be used in other ways without departure from its spirit as defined by the following claims.

I claim:

1. A protective device for a machine employing an intense beam of charged particles generated along a given axis by a power source comprising:
 (a) selectively operative switch means for producing a beam spoiling signal;
 (b) deflecting means operatively associated with the switch means for generating a deflection field transverse to the axis in response to a beam spoiling signal;
 (c) sensing means positioned off the beam axis and cooperating with the deflecting means to detect an inadvertently generated beam deflected away from the axis by the field; and
 (d) deenergizing means responsive to the sensing means and operatively associated with the power source for shutting off the power source when a deflected beam is sensed.

2. A device according to claim 1 wherein:
 (a) the machine generates an electron beam; and
 (b) the sensing means comprises an electrically conductive target positioned downstream in the direction of electron flow from the deflecting means, the target being electrically connected to the deenergizing means to actuate the deenergizing means through at least a portion of the electron current from a deflected beam.

3. A device according to claim 2 wherein:
 the target is annularly shaped and mounted concentrically with the axis.

4. A device according to claim 1 wherein:
 (a) the machine has two vacuum chambers positioned along the axis adjacent to one another;
 (b) a valve is interposed between the two vacuum chambers, the valve being movable between an open position allowing the beam to pass between the chambers and a closed position preventing gas from passing between the chambers; and (c) means responsive to movement of the valve away from the open position are provided for operating the switch means.

5. A device according to claim 1 wherein:

(a) the sensing means includes an electrically conductive diaphragm having a central aperture, the diaphragm being electrically insulated from the machine and mounted along the axis with the axis extending through the central aperture; and (b) the deenergizing means includes a relay interlocking beam power and having a solenoid electrically connected between the diaphragm and the beam power source.

6. An electron beam machine for working materials comprising:

(a) a cathode for emitting electrons;

(b) an anode for accelerating the electrons in a beam through a potential field between the cathode and anode along an axis of the machine;

(c) a control electrode for governing the flow of electrons in the beam;

(d) first means for selectively generating a beam cut-off signal;

(e) second means connected with and operatively responsive to the first means for deflecting the beam of electrons from the axis of the machine;

(f) third means for detecting a beam deflected from the axis by the second means; and (g) fourth means responsive to a beam detected by the third means for deenergizing the potential field between the cathode and anode.

7. Apparatus according to claim 6 wherein the third means includes an electrically conductive and apertured diaphragm.

8. Apparatus according to claim 7 wherein the fourth means includes a bistable relay electrically connected with apertured diaphragm and actuated by a current caused by impingement of a deflected beam on the diaphragm.

9. In an electron beam machine having a beam generator comprising a cathode, an anode, and a control electrode for controlling the acceleration of electrons along a beam axis and through a potential field between the cathode and anode and at least two vacuum chambers arranged consecutively along the beam axis, the improvement comprising:

(a) a valve interposed between the two vacuum chambers on the beam axis and movable between an open position permitting the electron beam to pass between the chambers and a closed position preventing gas from passing between the chambers;

(b) switch means operatively connected with the valve for generating a beam cut-off signal in response to a movement of the valve away from the open position;

(c) beam deflecting means laterally disposed from the beam axis between the beam generator and the valve and connected to the switch means for producing a beam deflection field on the beam axis in response to a signal from the switch means;

(d) beam detecting means including an electrically conductive and apertured diaphragm coaxially mounted on the beam axis between the deflecting means and the valve for detecting beams deflected by the deflecting means; and (e) deenergizing means including a bistable relay electrically connected to the apertured diaphragm and actuated by a current caused by impingement of a deflected beam on the diaphragm for deenergizing the potential field between the cathode and anode.

References Cited

UNITED STATES PATENTS

| | | | |
|---|---|---|---|
| 2,844,706 | 7/1958 | Lorenz. | |
| 2,882,445 | 4/1959 | Sprengeler et al. | 315—20 |
| 2,943,233 | 6/1960 | Vanaman et al. | 315—20 |
| 3,137,791 | 6/1964 | Gutter | 250—95 |
| 3,219,792 | 11/1965 | Pederson | 219—121 |
| 3,258,576 | 6/1966 | Schleich et al. | 219—121 |
| 3,328,672 | 6/1967 | Park | 317—31 |
| 3,351,731 | 11/1967 | Tanaka | 219—121 |
| 3,351,804 | 11/1967 | Kongable et al. | 315—20 |
| 3,370,171 | 2/1968 | Ohta | 250—49.5 |
| 3,395,279 | 7/1968 | Moore | 219—121 |

JOSEPH V. TRUHE, Primary Examiner

W. DEXTER BROOKS, Assistant Examiner